United States Patent
Garrett et al.

(10) Patent No.: US 9,104,538 B2
(45) Date of Patent: Aug. 11, 2015

(54) ASSESSMENT OF ELECTRONIC SENSOR DATA TO REMOTELY IDENTIFY A MOTOR VEHICLE AND MONITOR DRIVER BEHAVIOR

(71) Applicant: AIRBIQUITY INC., Seattle, WA (US)

(72) Inventors: Darrin Garrett, Kingston, WA (US); Darren Mann, Norfolk (GB)

(73) Assignee: Airbiquity Inc., Seattle, WA (US)

( * ) Notice: Subject to any disclaimer, the term of this patent is extended or adjusted under 35 U.S.C. 154(b) by 120 days.

(21) Appl. No.: 13/911,454

(22) Filed: Jun. 6, 2013

(65) Prior Publication Data

US 2013/0332024 A1 Dec. 12, 2013

Related U.S. Application Data

(60) Provisional application No. 61/657,192, filed on Jun. 8, 2012.

(51) Int. Cl.
   *G06F 19/00* (2011.01)
   *G06F 17/00* (2006.01)
   *G07C 5/00* (2006.01)

(52) U.S. Cl.
   CPC ............... *G06F 17/00* (2013.01); *G07C 5/008* (2013.01); *G07C 2205/02* (2013.01)

(58) Field of Classification Search
   CPC .... B60C 23/0408; F01L 13/0005; F01L 9/04; F02D 13/0253; F02D 13/06; F02D 2041/0012; F02D 41/064; H04W 4/22; Y02T 10/18
   USPC ......... 701/29, 34, 36, 51, 103, 104, 113, 115; 702/183; 705/14; 335/284; 340/441, 340/447; 123/472; 382/104; 348/143; 455/404.1
   See application file for complete search history.

(56) References Cited

U.S. PATENT DOCUMENTS

| | | | |
|---|---|---|---|
| 5,898,910 | A | 4/1999 | Miyake |
| 6,105,063 | A | 8/2000 | Hayes, Jr. |

(Continued)

FOREIGN PATENT DOCUMENTS

| | | |
|---|---|---|
| CA | 2242494 | 9/1997 |
| CN | 1268713 A | 10/2000 |

(Continued)

OTHER PUBLICATIONS

International Search Report for PCT/US2013/076710 dated Jul. 23, 2014; 6 pages.

(Continued)

*Primary Examiner* — James Trammell
*Assistant Examiner* — Sanjeev Malhotra
(74) *Attorney, Agent, or Firm* — Stolowitz Ford Cowger LLP

(57) ABSTRACT

A computing device is connected to a motor vehicle's diagnostic port or communication port to acquire vehicle sensor data, for example from various pressure, temperature, oxygen, fuel and other sensors typically installed on a motor vehicle for other reasons. Acquired sensor data is wirelessly transmitted to a remote server where the acquired sensor data can be compared to a database of stored sensor data to identify the motor vehicle. Additional functionality is described that leverages uploaded sensor data. Sensor data may be uploaded to the server in near-real time, and/or buffered locally and uploaded by periodic or episodic, push or pull communication protocols.

9 Claims, 2 Drawing Sheets

(56) References Cited

U.S. PATENT DOCUMENTS

| | | | |
|---|---|---|---|
| 6,148,253 A | 11/2000 | Taguchi | |
| 6,175,789 B1 | 1/2001 | Beckert | |
| 6,356,812 B1 | 3/2002 | Cragun | |
| 6,434,450 B1 | 8/2002 | Griffin, Jr. | |
| 6,487,717 B1 | 11/2002 | Brunemann | |
| 6,535,811 B1* | 3/2003 | Rowland et al. | 701/115 |
| 6,553,375 B1 | 4/2003 | Huang | |
| 6,559,773 B1 | 5/2003 | Berry | |
| 6,578,047 B1 | 6/2003 | Deguchi | |
| 6,650,534 B2 | 11/2003 | Tree | |
| 6,799,201 B1 | 9/2004 | Lee | |
| 6,812,942 B2 | 11/2004 | Ribak | |
| 6,853,910 B1 | 2/2005 | Oesterling | |
| 6,895,316 B2 | 5/2005 | Chen | |
| 6,915,176 B2 | 7/2005 | Novelli | |
| 6,961,536 B2 | 11/2005 | Himmel | |
| 6,973,476 B1 | 12/2005 | Naden | |
| 6,981,022 B2 | 12/2005 | Boundy | |
| 7,053,866 B1 | 5/2006 | Mimran | |
| 7,062,528 B2 | 6/2006 | Deguchi | |
| 7,107,234 B2 | 9/2006 | Deguchi | |
| 7,127,454 B2 | 10/2006 | Deguchi | |
| 7,139,660 B2 | 11/2006 | Sarkar | |
| 7,190,798 B2 | 3/2007 | Yasuhara | |
| 7,190,971 B1 | 3/2007 | Kawamoto | |
| 7,206,574 B2 | 4/2007 | Bright | |
| 7,218,925 B2 | 5/2007 | Crocker | |
| 7,251,473 B2 | 7/2007 | Alrabady | |
| 7,302,243 B2 | 11/2007 | Tarbouriech | |
| 7,327,228 B2 | 2/2008 | Min | |
| 7,334,041 B2 | 2/2008 | Swindells | |
| 7,346,435 B2 | 3/2008 | Amendola | |
| 7,362,239 B2 | 4/2008 | Franczyk | |
| 7,363,357 B2 | 4/2008 | Parupudi | |
| 7,366,892 B2 | 4/2008 | Spaur | |
| 7,379,541 B2 | 5/2008 | Iggulden | |
| 7,398,055 B2 | 7/2008 | Tajima | |
| 7,403,769 B2 | 7/2008 | Kopra | |
| 7,437,183 B2 | 10/2008 | Makinen | |
| 7,461,122 B2 | 12/2008 | Kawana | |
| 7,467,028 B2 | 12/2008 | Pilgrim | |
| 7,480,512 B2 | 1/2009 | Graham | |
| 7,505,732 B2 | 3/2009 | McDonough | |
| 7,552,009 B2 | 6/2009 | Nelson | |
| 7,613,564 B2 | 11/2009 | Vorona | |
| 7,623,949 B2 | 11/2009 | Nou | |
| 7,634,095 B2 | 12/2009 | Arun | |
| 7,643,788 B2 | 1/2010 | Habaguchi | |
| 7,643,913 B2 | 1/2010 | Taki | |
| 7,657,368 B2 | 2/2010 | Weiss | |
| 7,676,830 B2 | 3/2010 | Kuz | |
| 7,684,908 B1 | 3/2010 | Ogilvie | |
| 7,693,612 B2 | 4/2010 | Bauchot | |
| 7,805,542 B2 | 9/2010 | Hindman | |
| 7,812,712 B2 | 10/2010 | White | |
| 7,815,100 B2 | 10/2010 | Adams | |
| 7,826,945 B2 | 11/2010 | Zhang | |
| 7,885,599 B2 | 2/2011 | Yuhara | |
| 7,917,644 B2 | 3/2011 | Vedantham | |
| 7,970,436 B1 | 6/2011 | Katzer | |
| 8,014,915 B2 | 9/2011 | Jeon | |
| 8,117,246 B2 | 2/2012 | Sadovsky | |
| 2001/0018632 A1* | 8/2001 | Thomas | 701/113 |
| 2002/0040401 A1 | 4/2002 | Yasushi | |
| 2002/0087655 A1 | 7/2002 | Bridgman | |
| 2002/0091848 A1 | 7/2002 | Agresta | |
| 2002/0103622 A1* | 8/2002 | Burge | 702/183 |
| 2002/0123336 A1 | 9/2002 | Kamada | |
| 2002/0197983 A1 | 12/2002 | Chubb | |
| 2003/0003892 A1 | 1/2003 | Makinen | |
| 2003/0147534 A1 | 8/2003 | Ablay | |
| 2003/0195925 A1 | 10/2003 | Kaneko | |
| 2004/0002938 A1 | 1/2004 | Deguchi | |
| 2004/0158372 A1* | 8/2004 | Schwertfuehrer et al. | 701/34 |
| 2004/0259545 A1 | 12/2004 | Morita | |
| 2005/0031100 A1 | 2/2005 | Iggulden | |
| 2005/0060350 A1 | 3/2005 | Baum | |
| 2005/0085965 A1 | 4/2005 | Issa | |
| 2005/0089750 A1 | 4/2005 | Ng | |
| 2005/0132024 A1 | 6/2005 | Habaguchi | |
| 2005/0216553 A1 | 9/2005 | Mallonee | |
| 2005/0216902 A1 | 9/2005 | Schaefer | |
| 2005/0221878 A1 | 10/2005 | Van Bosch | |
| 2005/0249351 A1 | 11/2005 | Miyahara | |
| 2005/0278080 A1 | 12/2005 | Pilgrim | |
| 2005/0283284 A1 | 12/2005 | Grenier | |
| 2006/0015221 A1 | 1/2006 | Sarkar | |
| 2006/0025897 A1 | 2/2006 | Shostak | |
| 2006/0025907 A9 | 2/2006 | Kapolka | |
| 2006/0036356 A1 | 2/2006 | Rasin | |
| 2006/0041337 A1 | 2/2006 | Augsburger | |
| 2006/0141962 A1 | 6/2006 | Forbes | |
| 2006/0161312 A1 | 7/2006 | Juengling | |
| 2006/0202799 A1 | 9/2006 | Zambo | |
| 2006/0241847 A1* | 10/2006 | Kolmanovsky et al. | 701/103 |
| 2006/0253874 A1 | 11/2006 | Stark | |
| 2007/0005206 A1 | 1/2007 | Zhang | |
| 2007/0013676 A1 | 1/2007 | Obata | |
| 2007/0021885 A1 | 1/2007 | Soehren | |
| 2007/0043829 A1 | 2/2007 | Dua | |
| 2007/0100513 A1 | 5/2007 | Asano | |
| 2007/0100766 A1 | 5/2007 | Healy | |
| 2007/0126604 A1 | 6/2007 | Thacher | |
| 2007/0143798 A1 | 6/2007 | Jira | |
| 2007/0200663 A1 | 8/2007 | White | |
| 2007/0208464 A1 | 9/2007 | Moorhead | |
| 2007/0208471 A1* | 9/2007 | Lewis et al. | 701/36 |
| 2007/0265744 A1 | 11/2007 | Nicolai | |
| 2007/0265745 A1 | 11/2007 | Styles | |
| 2007/0272423 A1 | 11/2007 | Cutler | |
| 2007/0281606 A1 | 12/2007 | Baunach | |
| 2008/0004038 A1 | 1/2008 | Dunko | |
| 2008/0005733 A1 | 1/2008 | Ramachandran | |
| 2008/0007120 A1 | 1/2008 | Weyl | |
| 2008/0071882 A1 | 3/2008 | Hering | |
| 2008/0120175 A1* | 5/2008 | Doering | 705/14 |
| 2008/0143497 A1 | 6/2008 | Wasson | |
| 2008/0172147 A1 | 7/2008 | Taki | |
| 2008/0204178 A1* | 8/2008 | Maranville et al. | 335/284 |
| 2008/0214236 A1 | 9/2008 | Harb | |
| 2008/0248742 A1 | 10/2008 | Bauer | |
| 2008/0249886 A1 | 10/2008 | Woodard, Jr. | |
| 2008/0266051 A1 | 10/2008 | Taki | |
| 2008/0268810 A1 | 10/2008 | Kobayashi | |
| 2008/0269961 A1 | 10/2008 | Shitanaka | |
| 2008/0272900 A1* | 11/2008 | Schillinger et al. | 340/447 |
| 2009/0012675 A1 | 1/2009 | Laghrari | |
| 2009/0075624 A1 | 3/2009 | Cox | |
| 2009/0079555 A1 | 3/2009 | Aguirre De Carcer | |
| 2009/0119657 A1 | 5/2009 | Link, II | |
| 2009/0128286 A1 | 5/2009 | Vitito | |
| 2009/0138942 A1 | 5/2009 | Alrabady | |
| 2009/0168742 A1 | 7/2009 | Sumcad | |
| 2009/0178651 A1* | 7/2009 | Gale et al. | 123/472 |
| 2009/0204815 A1 | 8/2009 | Dennis | |
| 2009/0215466 A1 | 8/2009 | Ahl | |
| 2009/0265173 A1 | 10/2009 | Madhavan | |
| 2009/0265633 A1 | 10/2009 | Lim | |
| 2009/0265701 A1 | 10/2009 | Naslavsky | |
| 2009/0290757 A1* | 11/2009 | Mian et al. | 382/104 |
| 2009/0300595 A1 | 12/2009 | Moran | |
| 2010/0037057 A1 | 2/2010 | Shim | |
| 2010/0082559 A1 | 4/2010 | Sumcad | |
| 2010/0088367 A1 | 4/2010 | Brown | |
| 2010/0115505 A1 | 5/2010 | Touati | |
| 2010/0125387 A1 | 5/2010 | Sehyun | |
| 2010/0153207 A1 | 6/2010 | Roberts | |
| 2010/0222939 A1 | 9/2010 | Namburu | |
| 2010/0235045 A1 | 9/2010 | Craig | |
| 2011/0038307 A1 | 2/2011 | Madhavan | |
| 2011/0068912 A1* | 3/2011 | Tollkuehn et al. | 340/441 |
| 2011/0093136 A1 | 4/2011 | Moinzadeh | |
| 2011/0093153 A1 | 4/2011 | Moinzadeh | |
| 2011/0093154 A1 | 4/2011 | Moinzadeh | |

(56) References Cited

U.S. PATENT DOCUMENTS

| | | | |
|---|---|---|---|
| 2011/0093846 A1 | 4/2011 | Moinzadeh | |
| 2011/0196568 A1* | 8/2011 | Nickolaou et al. | 701/29 |
| 2011/0208567 A9 | 8/2011 | Roddy | |
| 2011/0224865 A1 | 9/2011 | Gordon | |
| 2012/0089423 A1 | 4/2012 | Tamir | |
| 2012/0094628 A1* | 4/2012 | Mader et al. | 455/404.1 |
| 2012/0130604 A1* | 5/2012 | Kirshon et al. | 701/51 |
| 2012/0259511 A1* | 10/2012 | Kuchler et al. | 701/36 |
| 2013/0054121 A1* | 2/2013 | Casoni et al. | 701/104 |
| 2013/0238165 A1 | 9/2013 | Garrettt | |
| 2013/0244634 A1 | 9/2013 | Garrettt | |
| 2013/0307972 A1* | 11/2013 | Stone et al. | 348/143 |
| 2013/0331056 A1* | 12/2013 | McKown et al. | 455/404.1 |
| 2014/0179274 A1 | 6/2014 | O'Meara | |

FOREIGN PATENT DOCUMENTS

| | | | |
|---|---|---|---|
| CN | 1452845 A | | 10/2003 |
| DE | 102 26 425 A1 | | 12/2003 |
| DE | 10 2005 044943 A1 | | 3/2006 |
| EP | 0 978 433 A2 | | 2/2000 |
| EP | 1 125 784 A2 | | 8/2001 |
| EP | 1 205 883 A1 | | 6/2008 |
| EP | 2 012 090 A2 | | 1/2009 |
| EP | 2 756 602 A | | 7/2014 |
| EP | 2 756 689 A | | 7/2014 |
| JP | 10163988 A | | 6/1998 |
| JP | 2002058013 A | | 2/2002 |
| JP | 2003085388 A | | 3/2003 |
| JP | 2003222523 A | | 8/2003 |
| JP | 2005028997 A | | 2/2005 |
| JP | 2005044391 A | | 2/2005 |
| JP | 2005244878 A | | 9/2005 |
| JP | 2005309645 A | | 11/2005 |
| JP | 2005311810 A | | 11/2005 |
| JP | 2005331682 A | | 12/2005 |
| JP | 2006121573 A | | 5/2006 |
| JP | 2006317421 A | | 11/2006 |
| JP | 2006319453 A | | 11/2006 |
| JP | 2006352850 A | | 12/2006 |
| JP | 2007015503 A | | 1/2007 |
| JP | 2008193337 A | | 8/2008 |
| TW | I291665 | | 12/2007 |
| TW | M329579 | | 4/2008 |
| TW | I311114 | | 2/2009 |
| TW | 200926037 A | | 6/2009 |
| TW | 200937248 A | | 9/2009 |
| TW | 200941347 A | | 10/2009 |
| WO | 00/43870 A2 | | 7/2000 |
| WO | 01/01076 A1 | | 1/2001 |
| WO | 02/19116 A2 | | 3/2002 |
| WO | 03/034235 A1 | | 4/2003 |
| WO | 2005/105509 A1 | | 11/2005 |
| WO | 2006/023713 A2 | | 3/2006 |
| WO | 2007/057895 A2 | | 5/2007 |
| WO | 2007/092463 A2 | | 8/2007 |
| WO | 2007/094988 A2 | | 8/2007 |
| WO | 2008/050136 A1 | | 5/2008 |
| WO | 2008/055117 A2 | | 5/2008 |
| WO | 2008/112586 A1 | | 9/2008 |
| WO | 2008/0124795 A2 | | 10/2008 |
| WO | 2009/016917 A1 | | 2/2009 |
| WO | 2009/058154 A1 | | 5/2009 |
| WO | 2011/046823 A2 | | 4/2011 |
| WO | 2011/047037 A1 | | 4/2011 |
| WO | 2011/047045 A1 | | 4/2011 |
| WO | 2011/047052 A1 | | 4/2011 |
| WO | 2011/047056 A1 | | 4/2011 |
| WO | 2013/039760 A1 | | 3/2013 |
| WO | 2013/039763 A1 | | 3/2013 |

OTHER PUBLICATIONS

International Search Report for PCT/US2010/051978 dated Jan. 19, 2012; 3 pages.

Fuchs et al. "End to End Content Delivery Using UPnP and WiFi Network." In: Connected Services in Mobile Networks—San Diego, CA, USA. Jan. 10-12, 2004. Retrieved on Jan. 7, 2012 from the internet at URL: <http://citeseerx.ist.psu.edu/viewdoc/download-?doi=10.1.1.110.7788&rep=rep1&type=pdf>. 11 pages.

"3rd Generation Partnership Project; Technical Specification Group Services and System Aspects Push Architecture (Release 6); 3GPP TR 23.976," ETSI Standards; v. 3-SA2, No. V6 1.0; pp. 1-34, Jun. 1, 2004.

"Hybrid Vehicular Display" UTC; Aug. 24, 2004; United States; 5 pages.

"Mobile Device used as an External Graphical User Interface for Telematics Hardware installed in a Car. Demonstrating Speeding control and Road User Charge;" Disclosed by IBM; UTC; Oct. 13, 2005; 2 pages. Best Available Copy.

"Vehicle Console Personalization" Aug. 10, 2006; UTC; United States; 3 pages.

Nilsson et al.; "Secure Firmware Updates Over the Air in Intelligent Vehicles," May 19-23, 2008; 5 pages.

Supplementary European Search Report based on EP 06 71 9988 completed Jun. 13, 2008; 8 pages.

United States Patent and Trademark Office ISA; PCT International Search Report; PCT/US2008/056323; Jun. 30, 2008; 2 pages.

Ryu et al,: "The Design of Remote Vehicle Management System Based on OMA DM Protocol and AUTOSAR S/W Architecture;" Jul. 23-25, 2008; 5 pages.

Anonymous: "NAVTEQ, Nokia and Magneti Marelli Integrate Smartphone Into Car Entertainment System," Internet citation, Sep. 17, 2009, pp. 1-3. Retrieved from the Internet: URL: http://www.gadgetpaper.com/navteq-nokia-and-magneti-marelli-integrate-smartphone-into-care-entertainment-system/ [retrieved on Jan. 28, 2011] p. 2, paragraph 13.

Alpine Electronics of America, Inc.; "Alpine Launches Mobile Phone Solution That Integrates With Car Audio Head Units;" Dec. 23, 2009; 2 pages.

Visteon Corporation; "Visteon Helps Connect Drivers and Passengers to Their Vehicle . . . and Their Vehicle to the World," Jan. 7, 2010; http://www.prnewswire.com/news-releases/visteon-helps-connect-drivers-and-passengers-to-their-vehicles--and0-their-vehicles-to-the-world-80902587.html. 3 pages.

European Patent Office; International Search Report for PCT/US2009/062431; Jan. 25, 2010; 3 pages.

Marisetty et al., "An architecture for In-Vehicle Infotainment Systems," Jan. 29, 2010; URL: http://www.ddj.com/embedded-systems/222600438. 21 pages.

Global Patent Solutions LLC, "Search Report" for Search Name: Centralized Management of Motor Vehicle Software Applications and Services, Jul. 30, 2010; 19 pages.

International Search Report dated Dec. 15, 2010 for PCT/US2010/052515; 3 pages.

International Search Report dated Dec. 20, 2010 for PCT/US2010/052511; 4 pages.

Global Patent Solutions LLC, "Additional Search Results" for Search Name: Centralized Management of Motor Vehicle Software Applications and Services, Dec. 27, 2010; 4 pages.

Global Patent Solutions LLC, "Additional Search Results" dated Feb. 5, 2011; 4 pages.

International Search Report dated Feb. 10, 2011 for PCT/US2010/052493; 5 pages.

International Search Report dated Feb. 10, 2011 for PCT/US2010/052502; 5 pages.

Global Patent Solutions LLC, "Additional Search Results" dated Feb. 10, 2011; 4 pages.

Supplementary European Search Report based on EP 08 73 1753 dated Sep. 19, 2012; 7 pages.

International Search Report for PCT/US2012/053977 dated Nov. 27, 2012; 2 pages.

Extended European Search Report for European Application No. EP 10 82 4027 dated May 2, 2013; 8 pages.

International Search Report for PCT/US2013/044448 dated Jan. 14, 2014; 2 pages.

Stolowitz Ford Cowger LLP—List of Related Cases; Mar. 12, 2014; 1 page.

* cited by examiner

ASSESSMENT OF ELECTRONIC SENSOR DATA TO REMOTELY IDENTIFY A MOTOR VEHICLE AND MONITOR DRIVER BEHAVIOR

RELATED APPLICATIONS

This application is a non-provisional of U.S. Provisional Application No. 61/657,192 filed Jun. 8, 2012 and incorporated herein by this reference.

COPYRIGHT NOTICE

© 2012-2013 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure pertains to powered vehicles, and more specifically to motor vehicles, and concerns communications of data between a vehicle and a centralized server to enable various beneficial applications.

BACKGROUND OF THE INVENTION

The ubiquitous CAN bus (for controller area network) is a vehicle bus standard designed to allow microcontrollers and devices to communicate with each other within a vehicle without a host computer. CAN bus is one of five protocols used in the OBD-II vehicle diagnostics standard. The OBD-II standard has been mandatory for all cars and light trucks sold in the United States since 1996, and the EOBD standard has been mandatory for all petrol vehicles sold in the European Union since 2001 and all diesel vehicles since 2004. CAN is a multi-master broadcast serial bus standard for connecting electronic control units (ECUs).

Each node is able to send and receive messages, but not simultaneously. A message consists primarily of an ID (identifier), which represents the priority of the message, and up to eight data bytes. It is transmitted serially onto the bus. This signal pattern is encoded in non-return-to-zero (NRZ) and is sensed by all nodes. The devices that are connected by a CAN network are typically sensors, actuators, and other control devices. In general, these devices are not connected directly to the bus, but through a host processor and a CAN controller. In any event, the CAN networks are confined to the motor vehicle.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In general, on-board electronic communications continue to evolve in motor vehicles, but they remain confined in the vehicle. One feature of the present disclosure extends aspects of the on-board networks, sensors and other nodes to a remote server location.

In another aspect of this disclosure, a remote server can acquire data from a motor vehicle, including on-board sensor data.

In still another aspect, sensor data can be used to remotely identify a motor vehicle at a remote server.

In still another aspect, sensor data can be used to remotely identify a current driver of a motor vehicle at a remote server.

Additional aspects and advantages of this invention will be apparent from the following detailed description of preferred embodiments, which proceeds with reference to the accompanying drawings.

DETAILED DESCRIPTION OF PREFERRED EMBODIMENTS

A problem arises in that the data communications ports on some vehicles do not provide a Vehicle Identification Number (VIN), which is a unique identifier. Without the ability to uniquely identify a vehicle, a fleet management system is severely constrained. For example, it cannot implement an automated provision system to quickly provision the vehicle systems with calibration parameters. In some case, such parameters may be unique to the behavior of a vehicle. Downloaded parameters or other data may be used by on-board software. In some embodiments on-board software or systems may utilize driver behavior algorithms for monitoring driver behavior. Further, an automated system cannot collect data from vehicles without having to manually correlate the data to the fleet vehicles, if possible, by some other means. Various advantageous functions can be implemented from a remote server given a way to uniquely identify each vehicle.

In an embodiment, a computing device may be connected to a motor vehicle's diagnostic port or communication port to acquire vehicle sensor data, for example from various pressure, temperature, oxygen, fuel and other sensors typically installed on a motor vehicle for other reasons. The computing device may be a mobile device such as a smart phone. The device may be connected to a port, for example an OBD port. The device may be connected by cable or short-range wireless connection (e.g., a Bluetooth® connection) to an on-board network.

Acquired sensor data may be wirelessly transmitted via the smart phone to a remote server where the acquired sensor data can be stored and or compared to a database of stored sensor data to identify the motor vehicle and for other functions. Acquired sensor data may also be transmitted via an on-board or embedded NAD (network access device).

Sensor data may be uploaded to the server in near-real time, and/or buffered locally and uploaded by periodic or episodic, push or pull communication protocols. Acquired sensor data may be stored at a central server. Acquired data may be stored in a database coupled to a central server. It may be used to form stored baseline data. The determined vehicle ID can be used by a backend server system to compare the historical operation of the vehicle to determine if there are any anomalies associated with its behavior. In addition the vehicle ID can be used to determine if any anomalies may be caused by the driver operating the vehicle, as further explained below.

Further, the vehicle ID may be used for provisioning data or software from the server to the vehicle, especially to adapt it to current conditions.

Figure 1:
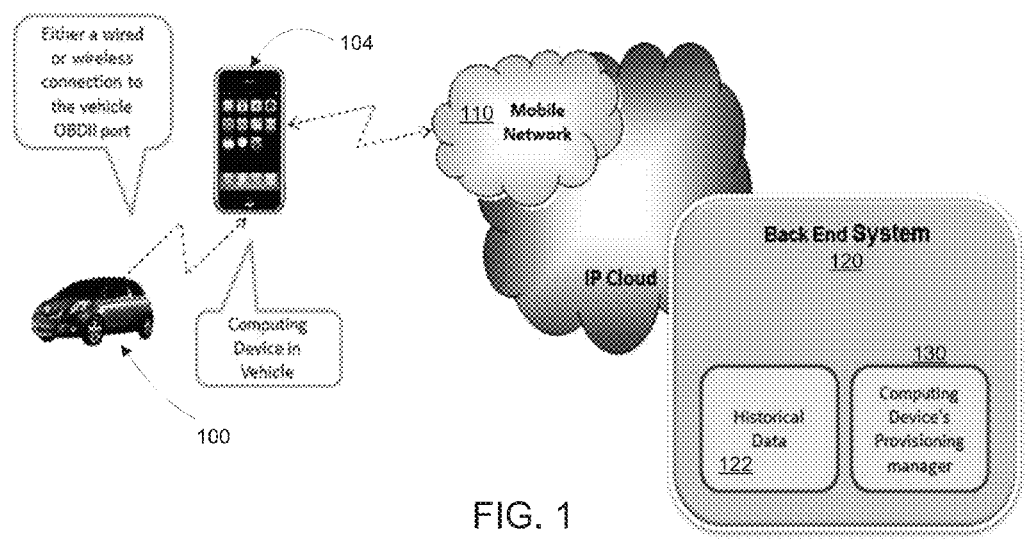
FIG. 1 is a simplified block diagram illustrating selected components of one example of a fleet management monitoring system consistent with the present disclosure.

In FIG. 1, a simplified block diagram illustrates the main components of one example of a fleet management or driver behavior monitoring system. In this example, a motor vehicle's data communication port 100 or other interface is coupled, via a cable or wireless connection, to a computing and communications device, such as a user's "smart phone" 104. For example, a Bluetooth® connection may be used, or similar short-range wireless connection, between the portable device and the vehicle port/adapter, but this connection can be made via any means available.

In an embodiment, the smart phone 104 communicates via the cellular data communication network 110 (aka "mobile network"), and IP gateway where needed, to a remote server ("back end system") 120 which receives and stores and maintains data of several types. One type may be historical data 122. Historical data 122 may include, but is not limited to, the following examples: (a) sensor data for vehicle identification; (b) historical driver and vehicle behavior data; (c) calibration parameters and other data for download to the vehicle and (d) geographic location data provided, for example, by an internal or external GPS sensor. In addition to historical data, the server system may include a provisioning manager 130 for provisioning the computing device in the vehicle. The computing device in the vehicle may comprise a portable device, as illustrated, or in another embodiment one or more processors (not shown) that are embedded in the vehicle for various purposes.

In some embodiments, stored baseline sensor data includes sensor data acquired from a corresponding motor vehicle during at least one known steady-state condition. To illustrate, a first steady state condition may be defined within a predetermined time window, for example 5 seconds, after startup of the vehicle engine from a cold start. This may be called a cold condition.

A second steady-state condition may be defined after expiration of at least a predetermined minimum time period of continuous operation of the vehicle engine. For example, this period may be on the order of 5 or 10 minutes. It may be called a "hot" or running condition. In some embodiments, the stored baseline sensor data includes sensor data acquired from a corresponding motor vehicle during the cold condition. In some embodiments, the stored baseline sensor data includes data acquired from a corresponding motor vehicle during the hot or running condition. An ensemble of multiple sensor readings, for example readings from three or four different sensors, may be stored at the server and used to identify a remote vehicle. In some embodiments, the sensor readings may be cold condition, hot condition, or a combination of the two types.

By way of illustration and not limitation, vehicle sensors used to provide data may include the following:
  engine coolant temperature
  engine air temperature
  fuel rail pressure
  engine oil temperature
  absolute throttle position limit
  engine RPM at idle
  Lambda exhaust oxygen sensor voltage So, for example, engine RPM at idle may be acquired, at cold condition, as well as the same metric at a hot condition. The same data (hot and cold) may be acquired for fuel rail pressure and engine oil temperature, for a total of nine measurements. Data sets of this type may be used to identify the vehicle. An elapsed time period may be used to delineate cold to hot. Or, a rate of change may be used to indicate a running (steady-state) condition. Other sensors may be used in addition, or in lieu of those mentioned. A greater number of sensors generally will better distinguish one vehicle from another. Comparison of acquired data to previously stored baseline data may be accomplished using known database query technologies. Fuzzy matching may be used.

In some implementations, said acquiring sensor data from the remote vehicle includes acquiring sensor data for at least three of the foregoing steady-state sensor output values; and wherein said comparing step includes comparing the at least three steady-state sensor output values to the corresponding stored baseline data.

Thus in one aspect of the present disclosure, a method of identifying a vehicle may comprise a combination of characterizing the sensor data values that are read from the vehicle data communication port at known steady state vehicle conditions, and characterizing certain sensor values as the state of the vehicle is changing in a previously characterized rate and direction of change. The accuracy of the vehicle sensor measurements preferably are on the order of <=+/−1 accuracy.

Other metrics may include dynamic measurement conditions. Examples of dynamic measurements may include, without limitation, the following:
  Engine idle at startup mapped to previously recorded engine cold start temperatures.
  Engine idle at specified hot engine temperatures
  The duration of engine temperature change from cold start to hot temp relative to a previously recorded average engine load over the time it takes to change from cold temp to hot temp.
  GPS location to differentiate between two vehicles with similar sensor data values.

In an embodiment, we propose to characterize a vehicle based in part on steady state sensor output values. This would involve the measurement of vehicle sensor data provided by the data communication port under steady state vehicle connections such as but not limited to the following:
  Engine coolant temperature, typically measured in a range of −40° F. to 419° F. (−40° C. to 215° C.). This sensor typically has an accuracy of +/−5% which equates to a result in deviation from one sensor output to another of +22.95° F. (+5° C.) to −22.95° F. (−5° C.) relative to the actual temperature of the coolant. With this output deviation from sensor to sensor the output can be used along with other types sensor outputs to develop a "finger print" for the vehicle.
  Engine air temperature is typically measured in a range of −40° F. to 419° F. (−40° C. to 215° C.). This sensor typically has a accuracy of +/−5% which equates to can result in a deviation from one sensor to another of +22.95° F. (+5° C.) to −22.95° F. (−5° C.) relative to the actual temperature of the engine intake air. With this output deviation from sensor to sensor the output can be used along with other types sensor outputs to develop a "finger print" for the vehicle.
  Fuel Rail Pressure will vary greatly from one make and model vehicle to another. For same make and model vehicles there will be a deviation from one vehicle to another that is a function of the accuracy of the fuel pressure regulator and the fuel pressure sensor. Even if these two devices are 1% accurate the total accuracy will be +/−2%. This is a measurable sensor output that is unique to a specific vehicle.
  Engine oil temperature will vary greatly from one make and model vehicle to another. For same make and model vehicles there will be a deviation from one vehicle to another that is a function oil viscosity, engine block mass and thermal dissipation, and oil temperature accuracy which typically is +/−5%. This is a measurable sensor output that is unique to a specific vehicle.

Absolute throttle position is measured in 0 to 100% maximum throttle opening. From same vehicle make and model or for different vehicle make and model the minimum value could be unique. This is due to the mechanical closed throttle limit which is often governed by an air idle set screw or throttle casting closed position stop.

Engine RPM: This value is usually within 1% of the actual the engine RPM, however the engine RPM is a factor of many vehicle specific variables which affect the engine RPM at any steady state condition. These vehicle specific variables include the temperature of the engine and air at steady state condition, upstream of the throttle air pressure drop due to air filter cleanliness. How well each engine cylinder is generating cylinder pressure during the fuel and air combustion process, and the closed loop engine idle RPM where a desired measured air fuel ratio has been obtained by the engine management system that is relative to stoichiometric air fuel ratio at the desired engine RPM for the fuel typed used. This desired engine RPM can be the product of the engine management system learned output that results in the best emission output of the engine at that steady state condition and it will vary from one vehicle to another.

Lambda sensor. For the specific fuel used in the vehicle the Lambda sensor voltage output range can vary from one sensor to another due to age of the sensor, sensor accuracy, sensor manufacturing techniques for oxygen reference cell. The number of active lambda sensors that can be measured can be used to determine difference for vehicle make and models that have engines with different number of cylinders or difference sophistication of the engine management system which is responsible for controlling engine output relative to engine emissions. In an embodiment, several of the foregoing metrics are used in combination to determine a unique identification or profile of a vehicle.

In another aspect, we characterize the vehicle's dynamic state change to determine a rate of change profile for sensor output values. For example:
1. Engine idle RPM as the vehicle changes temp from cold start to a predefined hot operating temperature.
2. Engine oil temperature change relative to engine coolant temperature change from a cold start engine temperature to a predefined hot engine temperature.

Some embodiments thus may be summarized as follows: A computer-implemented method of identifying a motor vehicle comprising: acquiring first sensor data from the vehicle during a first steady state operating condition of the vehicle; acquiring second sensor data from the vehicle during a second steady state operating condition of the same vehicle; wherein the first and second sensor data each include data acquired from no less than three sensors installed on board the vehicle, the first and second data being acquired from the same sensors at different times; and storing the acquired first and second sensor data so as to form baseline sensor data for use in subsequent identification of the vehicle.

A method consistent with the present disclosure may further include comparing the first and second sensor data to stored baseline sensor data; and forming an identifier of the vehicle based on the said comparing step.

Figure 2:
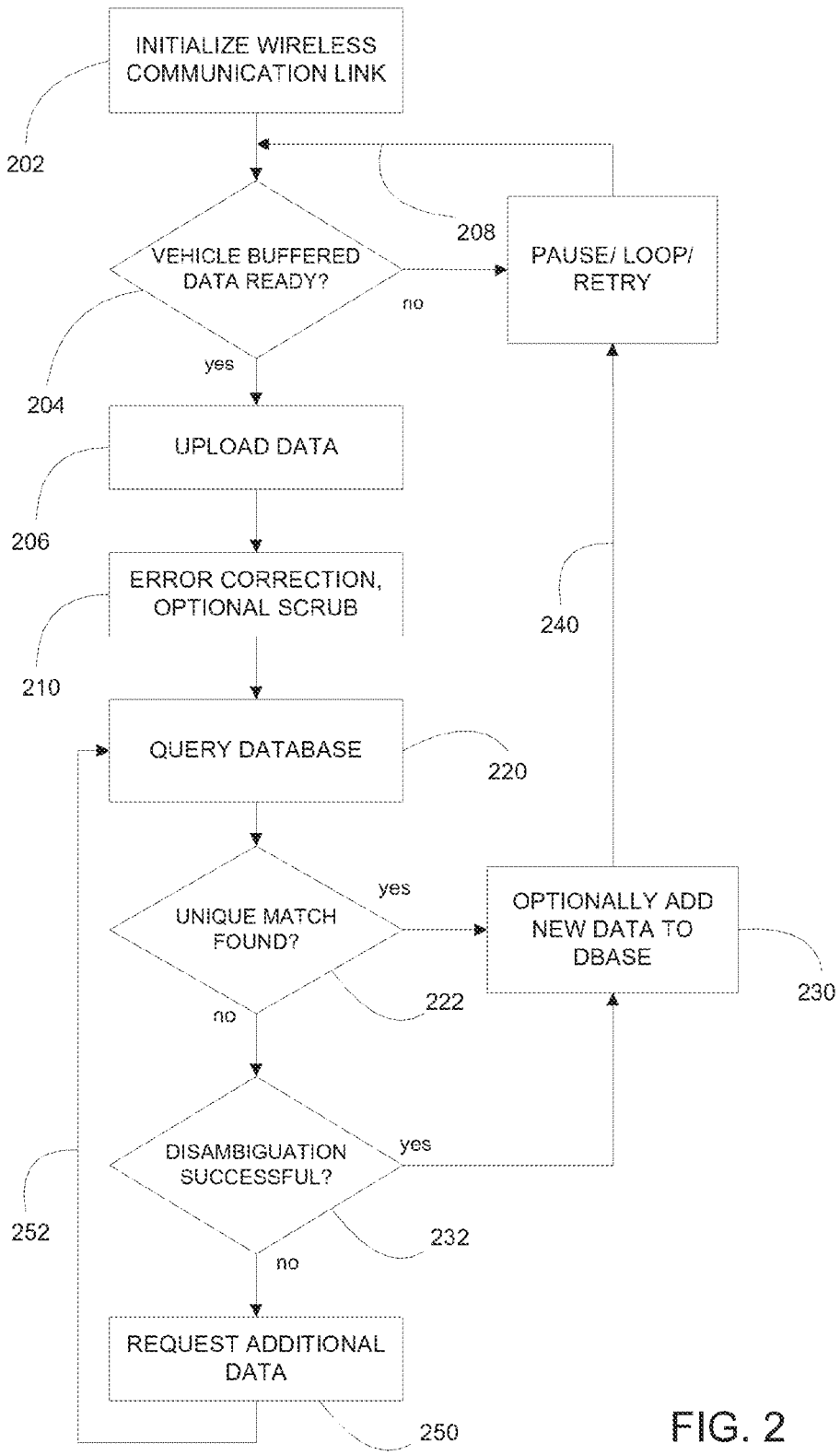
FIG. 2 illustrates a server-based process to collect electronic sensor data from a remote vehicle.

FIG. 2 is a simplified flow diagram illustrating a server-based process 200 to collect electronic sensor data from a remote vehicle. In the figure, a wireless communication link 202 is formed between a central server, for example, a fleet management system, and a remote vehicle. The link may be over the wireless telecom network. The link may utilize in-band signaling to transmit data over a voice channel. The link may utilize a data service.

If sensor data is buffered at the vehicle and is ready, decision 204, it is uploaded, block 206. If it is not ready, the process may loop at 208. Uploaded data may undergo error correction in the process, and optionally it may be scrubbed to help ensure valid data, block 210.

After data is ready, a database coupled to the server, for example, a baseline database, may be queried to look for matching data, block 220. Matching baseline sensor data may be used to identify the vehicle. If a unique match is found, decision 222, the data may be added to a database, block 230. The process may loop via 240 in some cases to acquire additional data. If a unique match was not found initially at 222, an effort may be undertaken to disambiguate among plural vehicles reporting similar sensor values, for example, based on acquiring corresponding location data of each of the vehicles. Location data may be acquired from GPS receiver in the vehicle. A GPS receive may be coupled to an on-board network so that the location data is accessible. In the case of using a mobile device such as a smart phone for communication with the server, the smart phone embedded GPS receiver may be used to acquire location of a vehicle. If disambiguation does not succeed, decision block 232, additional sensor data may be requested, block 250, and the matching process repeated via loop 252.

Driver Behavior

Another feature of the present disclosure involves acquiring sensor data, which may be buffered, stored, or transmitted in near-real time, and analyzing that sensor data to infer characteristics of driver behavior. Data may be accumulated over time for a given driver to form a profile. Deviation from the profile may indicate driver impairment, due to medical or other factors. Profiles based on sensor data also may be used to infer the identity of a current driver of a vehicle.

Fuel Efficiency

Another feature of the present disclosure involves acquiring sensor data, and based on the stored data, calculating a mileage rate or fuel efficiency of the motor vehicle. The mileage rate refers to miles traveled per gallon of liquid fuel, or per kilowatt-hour of electrical energy for an electric vehicle. Using the techniques above, fuel efficiency may be determined for each vehicle, under various conditions. Deviation from the normal fuel efficiencies may indicate a maintenance issue that requires attention. If no maintenance issue exists then the difference in calculated average fuel efficiency can also be used to uniquely identify the vehicle if driver behavior can be ruled out as a reason for fuel efficiency variability.

In some cases, changes in vehicle performance as reflected in sensor data may be due to driver behavior rather than maintenance issues. Distinguishing between these two causes may be achieved by analysis of data acquired over time. Other case—very different vehicle causes very different readings, not the driver.

It will be obvious to those having skill in the art that many changes may be made to the details of the above-described embodiments without departing from the underlying principles of the invention. The scope of the present invention should, therefore, be determined only by the following claims.

The invention claimed is:
1. A method for remotely identifying a motor vehicle, comprising:
(a) electronically acquiring sensor data from a plurality of electronic sensors installed in the vehicle;

(b) transmitting the acquired sensor data via a wireless link, from the vehicle to a remote server;
(c) at the remote server, receiving the acquired sensor data and comparing the acquired sensor data to baseline data stored at the remote server;
(d) identifying the motor vehicle based on the said comparison; and
(e) characterizing a vehicle's dynamic state change to determine a rate of change profile for at least one of the plurality of electronic sensors installed in a given vehicle, and adding the dynamic state change profile to the stored baseline data for identifying the corresponding vehicle.

2. The method according to claim 1 wherein the stored baseline data includes sensor data previously acquired from a plurality of sensors on board each one of a plurality of motor vehicles.

3. The method according to claim 2 wherein the stored baseline data includes, for a selected vehicle, data acquired from at least three sensors selected from the group consisting of the following sensors—
engine coolant temperature
engine air temperature
fuel rail pressure
engine oil temperature
absolute throttle position limit
engine RPM at idle
Lambda exhaust oxygen sensor voltage.

4. The method according to claim 3 wherein the stored baseline data corresponding to at least one of the selected sensors includes first data acquired under a first operating condition of the corresponding motor vehicle, and second data acquired under a second operating condition of the corresponding motor vehicle.

5. The method according to claim 4 wherein the first operating condition of the corresponding motor vehicle is a cold condition and the second operating condition of the corresponding motor vehicle is a steady-state operating condition.

6. The method according to claim 5 wherein the steady-state operating condition is defined as a predetermined period of time after startup of the vehicle.

7. The method according to claim 1 wherein the dynamic state change is determined from a cold start condition to a predefined hot operating temperature.

8. The method according to claim 3 wherein said identifying the motor vehicle includes disambiguating among plural vehicles reporting similar sensor values, based on acquiring corresponding location data of each of the vehicles.

9. The method according to claim 8 wherein said acquiring corresponding location data of each of the vehicles from a GPS receiver located in the respective vehicle.

* * * * *